(12) United States Patent
Fuchs et al.

(10) Patent No.: US 10,116,539 B1
(45) Date of Patent: Oct. 30, 2018

(54) MULTI-LINK NETWORK GATEWAY WITH MONITORING AND DYNAMIC FAILOVER

(71) Applicant: Tempered Networks, Inc., Seattle, WA (US)

(72) Inventors: Ludwin Fuchs, Seattle, WA (US); Paul David Lambros Bartell, Seattle, WA (US); Bryan David Skene, Seattle, WA (US); Jeffrey Michael Ahrenholz, Mercer Island, WA (US); Konstantin Tsoy, Seattle, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

(21) Appl. No.: 15/987,762

(22) Filed: May 23, 2018

(51) Int. Cl.
*H04L 12/24* (2006.01)
*H04L 12/26* (2006.01)
*G06F 15/173* (2006.01)

(52) U.S. Cl.
CPC ........ *H04L 43/0811* (2013.01); *H04L 41/065* (2013.01)

(58) Field of Classification Search
CPC ..... H04L 12/4633; H04L 45/44; H04W 28/08
See application file for complete search history.

(56) References Cited

U.S. PATENT DOCUMENTS

| | | |
|---|---|---|
| 5,835,727 A | 11/1998 | Wong et al. |
| 6,981,156 B1 | 12/2005 | Stern et al. |
| 7,209,956 B2 | 4/2007 | Mache |
| 7,324,533 B1 | 1/2008 | DeLiberato et al. |
| 7,373,660 B1 | 5/2008 | Guichard et al. |
| 7,395,349 B1 | 7/2008 | Szabo et al. |
| 7,796,593 B1 | 9/2010 | Ghosh et al. |
| 7,881,199 B2 | 2/2011 | Krstulich |
| 7,996,894 B1 | 6/2011 | Chen et al. |
| 8,429,400 B2 | 4/2013 | Khalid et al. |

(Continued)

FOREIGN PATENT DOCUMENTS

| | | |
|---|---|---|
| WO | 2007038872 A1 | 4/2007 |
| WO | 2008039506 A2 | 4/2008 |

OTHER PUBLICATIONS

Asguard Networks, Inc., "SimpleConnectTM Product Information," Retrieved on Nov. 9, 2012, from http://www.asguardnetworks.com/product, 1 page.

(Continued)

*Primary Examiner* — Ranodhi Serrao
(74) *Attorney, Agent, or Firm* — John W. Branch; Lowe Graham Jones PLLC

(57) ABSTRACT

Embodiments are directed to managing communication networks. One or more links associated with a gateway computer may be monitored. Each link may be associated with a network addresses, and the gateway computer is associated with a gateway identifier (GID). Metrics associated with the monitored links may be provided. Scores may be associated with the links based on the metrics. The scores may be modified based on policy information. The links may be compared based on the scores and the policy information. A comparison may be employed to activate a portion of the links such that the activated links may be employed to communicate over the networks with other gateway computers. The links may be compared based on updated metrics. The comparison of the updated metrics may be used to activate another portion of the links that are associated with the GID.

24 Claims, 10 Drawing Sheets

(56) References Cited

U.S. PATENT DOCUMENTS

| | | | |
|---|---|---|---|
| 8,489,701 | B2 | 7/2013 | Manion et al. |
| 8,607,301 | B2 | 12/2013 | Carrasco |
| 8,886,827 | B2 | 11/2014 | Goel et al. |
| 8,959,513 | B1 | 2/2015 | Swaminathan |
| 9,264,522 | B1 | 2/2016 | Reeves et al. |
| 2002/0026532 | A1 | 2/2002 | Maeda et al. |
| 2002/0073182 | A1 | 6/2002 | Zakurdaev et al. |
| 2002/0143655 | A1 | 10/2002 | Traversat et al. |
| 2003/0061479 | A1 | 3/2003 | Kimura |
| 2003/0081620 | A1 | 5/2003 | Danner et al. |
| 2004/0143628 | A1 | 7/2004 | Bradford et al. |
| 2004/0268121 | A1 | 12/2004 | Shelest et al. |
| 2005/0052999 | A1 | 3/2005 | Oliver et al. |
| 2005/0265355 | A1 | 12/2005 | Havala et al. |
| 2006/0190458 | A1 | 8/2006 | Mishina et al. |
| 2007/0019641 | A1 | 1/2007 | Pai et al. |
| 2007/0081530 | A1 | 4/2007 | Nomura et al. |
| 2007/0226781 | A1 | 9/2007 | Chen et al. |
| 2007/0230352 | A1 | 10/2007 | Kokku et al. |
| 2007/0258440 | A1 | 11/2007 | Watanabe |
| 2008/0072282 | A1 | 3/2008 | Willis et al. |
| 2008/0082823 | A1 | 4/2008 | Starrett et al. |
| 2008/0151916 | A1 | 6/2008 | Jetcheva et al. |
| 2008/0288614 | A1 | 11/2008 | Gil et al. |
| 2008/0307519 | A1 | 12/2008 | Curcio et al. |
| 2009/0034738 | A1 | 2/2009 | Starrett |
| 2009/0129374 | A1 | 5/2009 | Yurchenko et al. |
| 2009/0210518 | A1 | 8/2009 | Verma et al. |
| 2009/0310518 | A1 | 12/2009 | Jayaram et al. |
| 2010/0014533 | A1 | 1/2010 | Hirano et al. |
| 2010/0024026 | A1 | 1/2010 | Ylonen et al. |
| 2010/0027442 | A1 | 2/2010 | Chockler et al. |
| 2010/0042747 | A1 | 2/2010 | Hascalovici et al. |
| 2010/0214959 | A1 | 8/2010 | Kuehnel et al. |
| 2010/0218235 | A1 | 8/2010 | Ganot |
| 2010/0254395 | A1 | 10/2010 | Smith et al. |
| 2011/0035466 | A1 | 2/2011 | Panirah |
| 2011/0090892 | A1 | 4/2011 | Cooke |
| 2011/0103393 | A1 | 5/2011 | Meier et al. |
| 2011/0141881 | A1 | 6/2011 | Joshi et al. |
| 2012/0110203 | A1 | 5/2012 | Ozawa |
| 2012/0163196 | A1 | 6/2012 | Jansen et al. |
| 2012/0304243 | A1 | 11/2012 | Li et al. |
| 2013/0018993 | A1 | 1/2013 | Hui et al. |
| 2013/0083725 | A1 | 4/2013 | Mallya et al. |
| 2013/0198830 | A1 | 8/2013 | Nemoto et al. |
| 2013/0254264 | A1 | 9/2013 | Hankinson et al. |
| 2013/0283364 | A1 | 10/2013 | Chang et al. |
| 2014/0133354 | A1 | 5/2014 | Scharf et al. |
| 2014/0150070 | A1 | 5/2014 | Peterson |
| 2014/0223507 | A1 | 8/2014 | Xu |
| 2014/0282817 | A1 | 9/2014 | Singer et al. |
| 2014/0307744 | A1 | 10/2014 | Dunbar et al. |
| 2014/0348131 | A1 | 11/2014 | Duan et al. |
| 2015/0024677 | A1 | 1/2015 | Gopal et al. |
| 2015/0046997 | A1 | 2/2015 | Gupta et al. |
| 2015/0067033 | A1 | 3/2015 | Martinsen et al. |
| 2015/0124823 | A1 | 5/2015 | Pani et al. |
| 2015/0135259 | A1 | 5/2015 | Ilyadis et al. |

OTHER PUBLICATIONS

Asguard Networks, Inc., "Welcome to Asguard Networks," Retrieved on Oct. 23, 2012, from http://www.asguardnetworks.com/, 1 page.

Asguard Networks, Inc., "SimpleConnectTM Quick Start Documentation Guide," Revision 1, Dec. 13, 2012, pp. 1-18.

Henderson, T. et al., "HIP-based Virtual Private LAN Service (HIPLS)," Network Working Group, Internet-Draft, The Boeing Company, Nov. 6, 2012, pp. 1-16.

International Search Report and Written Opinion for International Patent Application No. PCT/US2014/023632 dated Jun. 23, 2014, pp. 1-13.

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news, pp. 1-2.

Trusted Computing Group, Incorporated, "TCG Trusted Network Connect: IF-MAP Metadata for ICS Security," Specification Version 1.0, Revision 44, May 8, 2014, pp. 1-64.

Office Communication for U.S. Appl. No. 14/740,053 dated Jul. 29, 2015, pp. 1-10.

Office Communication for U.S. Appl. No. 14/204,907 dated Jul. 10, 2015, pp. 1-20.

Aoyagi, S. et al., "ELA: A Fully Distributed VPN System Over Peer-to-Peer Network," Proceedings of the 2005 Symposium on Applications and the Internet, 2005, IEEE, Computer Society; pp. 1-4.

Benyamina, D. et al., "Wireless Mesh Networks Design—A Survey," IEEE Communications Survey & Tutorials, vol. 14, No. 2, Second Quarter 2012, pp. 299-310.

International Search Report and Written Opinion for International Patent Application No. PCT/US2015/042993 dated Nov. 11, 2015, pp. 1-11.

Office Communication for U.S. Appl. No. 14/204,907 dated Dec. 2, 2015, pp. 1-14.

Official Communication for U.S. Appl. No. 15/156,254 dated Aug. 3, 2016, pp. 1-13.

Trusted Computing Group (Architects Guide; ICS Security Using TNC Technology, Oct. 2013, pp. 1-6.

Official Communication for U.S. Appl. No. 15/083,214 dated Oct. 25, 2016, pp. 1-11.

Office Communication for U.S. Appl. No. 14/740,053 dated Jan. 21, 2016, pp. 1-18.

Office Communication for U.S. Appl. No. 14/204,907 dated Feb. 24, 2016, pp. 1-20.

Official Communication for U.S. Appl. No. 15/083,214 dated Jul. 7, 2016, pp. 1-11.

Official Communication for U.S. Appl. No. 15/201,063 dated Nov. 2, 2016, pp. 1-11.

Official Communication for U.S. Appl. No. 15/156,254 dated Dec. 30, 2016, pp. 1-13.

Official Communication for U.S. Appl. No. 15/083,214 dated Jan. 9, 2017, pp. 1-5.

Official Communication for U.S. Appl. No. 15/156,254 dated May 5, 2017, pp. 1-13.

Official Communication for U.S. Appl. No. 15/083,214 dated Feb. 9, 2017, pp. 1-10.

Official Communication for U.S. Appl. No. 14/814,283 dated Jun. 9, 2017, pp. 1-18.

Official Communication for U.S. Appl. No. 15/201,063 dated Apr. 21, 2017, pp. 1-14.

Official Communication for U.S. Appl. No. 14/814,283 dated Nov. 30, 2015, pp. 1-8.

Official Communication for U.S. Appl. No. 14/814,283 dated Jun. 3, 2016, pp. 1-10.

Official Communication for U.S. Appl. No. 14/814,283 dated Aug. 23, 2016, pp. 1-7.

Official Communication for U.S. Appl. No. 14/814,283 dated Nov. 21, 2016, pp. 1-10.

Official Communication for U.S. Appl. No. 15/156,254 dated Oct. 19, 2017, pp. 1-13.

Lawton, "Machine-to-Machine Technology gears up for growth", 2004, pp. 12-15, IEEE Computer Society, pp. 1-4.

Official Communication for U.S. Appl. No. 15/670,925 dated Apr. 5, 2018, pp. 1-10.

Official Communication for U.S. Appl. No. 15/156,254 dated May 14, 2018, pp. 1-17.

Official Communication for U.S. Appl. No. 15/670,859 dated Jun. 29, 2018, pp. 1-29.

Official Communication for U.S. Appl. No. 15/924,148 dated Jun. 5, 2018, pp. 1-24.

MULTI-LINK NETWORK GATEWAY WITH MONITORING AND DYNAMIC FAILOVER

TECHNICAL FIELD

The present invention relates generally to network management, and more particularly, but not exclusively, to managing communication over a network in which host identity is distinct from its topological location on a network.

BACKGROUND

Modern computing systems or computing environments often include a very diverse collection of client computers, server computers, relays, gateways, or the like, that may be interconnected using heterogeneous networks comprised of different physical or logical networks. Also, in some embodiments, different network protocols may be used in the same computing environment by one or more computers. In some cases, one or more computers may have different links or interfaces to enable access the same or different networks. In some environments, one or more links associated with various routes or networks may perform differently depending on the various quality factors associated with a given route or network. Also, in some cases, metrics associated with the various quality factors may fluctuate overtime making some links more or less desirable. However, in dynamic computing environments it may be difficult to determine link quality. Likewise, protocol limitations, or the like, may make it difficult to select or utilize the most appropriate links for communication. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
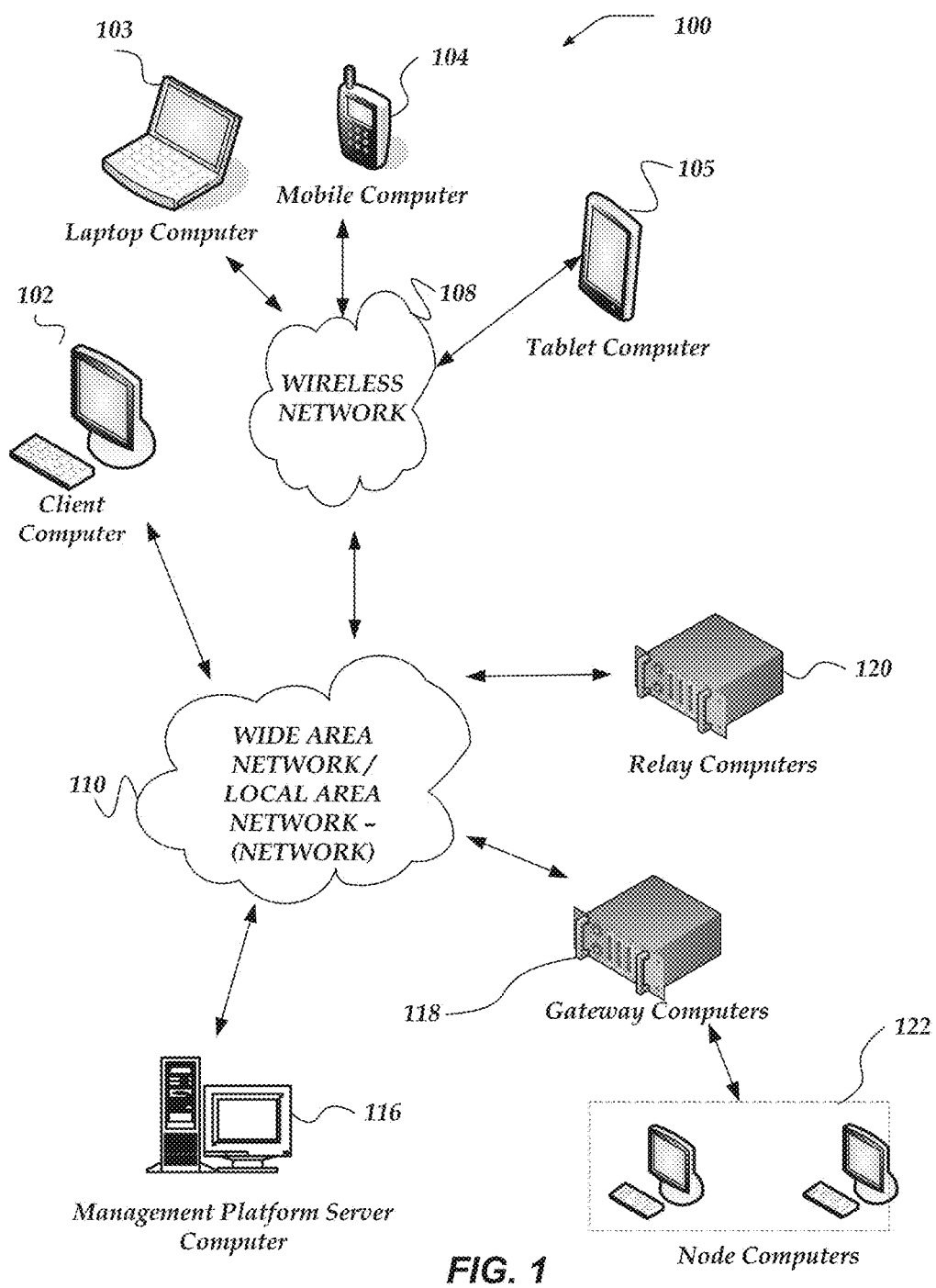
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. Phrases, such as, "in one embodiment," "in one or more embodiments, "some embodiments," "in one or more of the various embodiments," or the like, as used herein do not necessarily refer to the same embodiment, though it may. Furthermore, phrases, such as, "in one embodiment," "in one or more embodiments, "some embodiments," "in one or more of the various embodiments," or the like, as used herein do not necessarily refer to a different embodiment, although it may. Thus, as described below, various embodiments may be readily combined, without departing from the scope or spirit of the invention. Similarly, phrases, such as, "in one or more embodiments, "some embodiments," "in one or more of the various embodiments", or the like.

In addition, as used herein, the term "or" is an inclusive "or" operator, and is equivalent to the term "or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "overlay network," "mesh network," "industrial network" refer to a network of industrial computer/machines, workstations, client computers, gateway computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as overlay networks even when their topology or configuration is not strictly a mesh network or partial mesh network.

As used herein the term "physical network" refers to the actual communication network that interconnects one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network Also, physical networks may be considered to include the native communication protocols, network topology, and so on, that may be used to setup a overlay network in an various environments. In some cases, physical networks may be arranged to enable open communication between node computers, (e.g., machines, workstations, client computers, and so on), gateway computers, management platform computers, relay computers, or the like, that are on the physical network.

As used herein the terms "node," and "node computer" refer to computers that are endpoint computers interconnected over a physical network. Node computers may include client computers, smart phones, video cameras, sensors, network computers, industrial workstations, press machines, robots, packaging machines, automated milling machines, automated printing presses, pumps, valves, boilers, or the like. Node computers are considered to be computers or devices connected to the physical network exclusive of gateway computers, relay computers, management platform server computers, or the like. Nodes gain access to the networks managed management platform via gateway computers As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/overlay network. These intended recipients of these communication may be considered target node computers. Accordingly, a node computer may be a target node computer if it receives communications and it may be a source node computer if it sends communications.

As used herein the terms "gateway," or "gateway computer" refer to computers connected to a network that are disposed between the node computers and the physical network. Gateway computers may be network computers that may be arranged to provide security, access control, communication routing, or the like, for overlay networks or mesh networks. In some embodiments, gateway computers may be configured by another network computer, such as, a management platform computer.

As used herein the term "relay computer", or "relay" refer to one or more computers that serve as intermediaries for establishing connections between gateway computers that may be on different networks. In some cases, relay computers may be associated with network addresses that may be reached from more than one network.

As used herein the term "network address" refers to a value or values used for locating an endpoint in a network. In some embodiments, endpoints may include services, networks, network computers, client computers, applications, firewall, router, load balancers, node computers, gateway computers, relay computers, management platform computers, or the like. A network address may be assumed to comprise one or more components, such as, Internet Protocol (IP) address, other network address, a port number, VLAN identifier, tunnel identifier, routing interface identifier, physical interface identifier, a protocol identifier, or the like, or combination thereof. In some embodiments, port numbers may be TCP or UDP port numbers. For example, in some embodiments, a network address in a network may be assumed to include an IP address and a port. The particular constituent components or formats of network addresses may vary to meet one or more characteristics or requirements of the networks or communication protocols being used.

As used herein the terms, "gateway link," or "link" refer to physical, cellular, wireless, or logical network components that may be used to connect a gateway computer to one or more networks. Typically, different links may provide different ways or mechanism to reach the same networks. In some cases, one or more gateway links may enable access to one or more networks, sub-networks, locations, nodes, or the like, that may be unreachable via other gateway links. Gateway links may be associated with different network addresses or network interfaces. Different gateway links may support different communication protocols. Also, in some cases, gateway computers may be arranged to use two or more gateway links at the same time. In other cases, gateway computer may be arranged to use one gateway link at a time.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over one or more networks. In one or more of the various embodiments, a monitoring engine may be instantiated to monitor one or more links that may be associated with a gateway computer such that the one or more links may be associated with one or more network addresses, and where the gateway computer is associated with a gateway identifier (GID) that is separate from the one or more network addresses. In some embodiments, monitoring the one or more links may include determining one or more target computers that may be accessible over the one or more links. In one or more of the various embodiments, the one or more links may include a connection to one or more of a cellular wireless network, an Ethernet wired network, an optical fiber network, a microwave network, a plain old telephone system (POTS) network, or any type of a wireless network or wired network.

In one or more of the various embodiments, the monitoring engine may be arranged to provide one or more metrics that may be associated with the one or more monitored links based on the monitoring. In one or more of the various embodiments, instantiating a gateway engine that may be arranged to provide one or more scores that may be associated with the one or more links based on the one or more metrics. In one or more of the various embodiments, associating the one or more scores with the one or more links may include receiving a message from a node computer that may be directed to another node computer; determining an application that may be associated with the message; and modifying the one or more scores based on one or more of a type of the application or a type of content included with the message.

In one or more of the various embodiments, the gateway engine may be arranged to modify the one or more scores based on policy information provided by a platform engine. In one or more of the various embodiments, the policy information may define one or more network routes in an overlay network to the one or more other gateway computers such that each route may be accessible by the one or more links.

In one or more of the various embodiments, the gateway engine may be arranged to compare the one or more links based on the one or more scores and the policy information.

In one or more of the various embodiments, the gateway engine may be arranged to employ a result of the comparison to activate at least a portion of the one or more links such that the activated portion of the links may be employed to communicate over the one or more networks with one or more other gateway computers. In one or more of the various embodiments, activating the portion of the links may include providing a network address that may be associated with the activated portion of the links to the platform engine such that the platform engine associates the GID with the network address. In one or more of the various embodiments, activating the portion of the one or more links may include activating two or more links; and employing the two or more activated links to simultaneously communicate over the one or more networks with the one or more other gateway computers. In one or more of the various embodiments, the gateway engine may be arranged to compare the one or more links based on one or more updated metrics. In one or more of the various embodiments, the gateway engine may be arranged to employ a result of the comparison of the updated metrics to activate another portion of the one or more links such that a network address of the other portion of links is associated with the GID.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, management platform server computer 116, gateway computers 118, relay computers 120, node computers 122, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like.

For example, client computers 102-105 may be configured to operate as a web server, client application, media player, mobile telephone, game console, desktop computer, or the like. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 122 represent one or more client computer, network computer, or network devices, or the like, that may be arranged to access networks via a gateway computer. Each node computer may be associated with a gateway computer that enable network access to other node computers, gateway computers, or the like. Node computers 122 may be arranged to communicate with their associate gateway computer. Accordingly, in some embodiments, their gateway computer may route the node computer communication according to policy provided by a management platform server, such as, management platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include overlay networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G)

5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, management platform server computer 116, gateway computers 118, relay computers 120, node computers 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates management platform server computer 116, gateway computers 118, relay computers 120, node computers 122 each as a single computer, the innovations or embodiments are not so limited. For example, one or more functions of management platform server computer 116, gateway computers 118, relay computers 120, node computers 122 or the like, may be distributed across one or more distinct network computers. Moreover, management platform server computer 116, gateway computers 118, relay computers 120, node computers 122 are not limited to a particular configuration such as the one shown in FIG. 1. Thus, in one or more embodiments, management platform server computer 116, gateway computers 118, relay computers 120, node computers 122 may be implemented using a plurality of network computers. In other embodiments, management platform server computer 116, gateway computers 118, relay computers 120, node computers 122 may operate as a plurality of network computers within a cluster architecture, a peer-to-peer architecture, or the like. Also, in some embodiments, one or more processors on one or more network computers may be arranged to perform one or more actions of management platform server computer 116, gateway computers 118, relay computers 120, node computers 122, or the like. Further, in at least one of the various embodiments, management platform server computer 116, gateway computers 118, relay computers 120, node computers 122 may be implemented using one or more cloud instances in one or more cloud computing environments. Likewise, in at least one of the various embodiments, management platform server computer 116, gateway computers 118, relay computers 120, node computers 122 may be implemented using one or more container instances in one or more container computers environments.

Illustrative Client Computer

Figure 2:
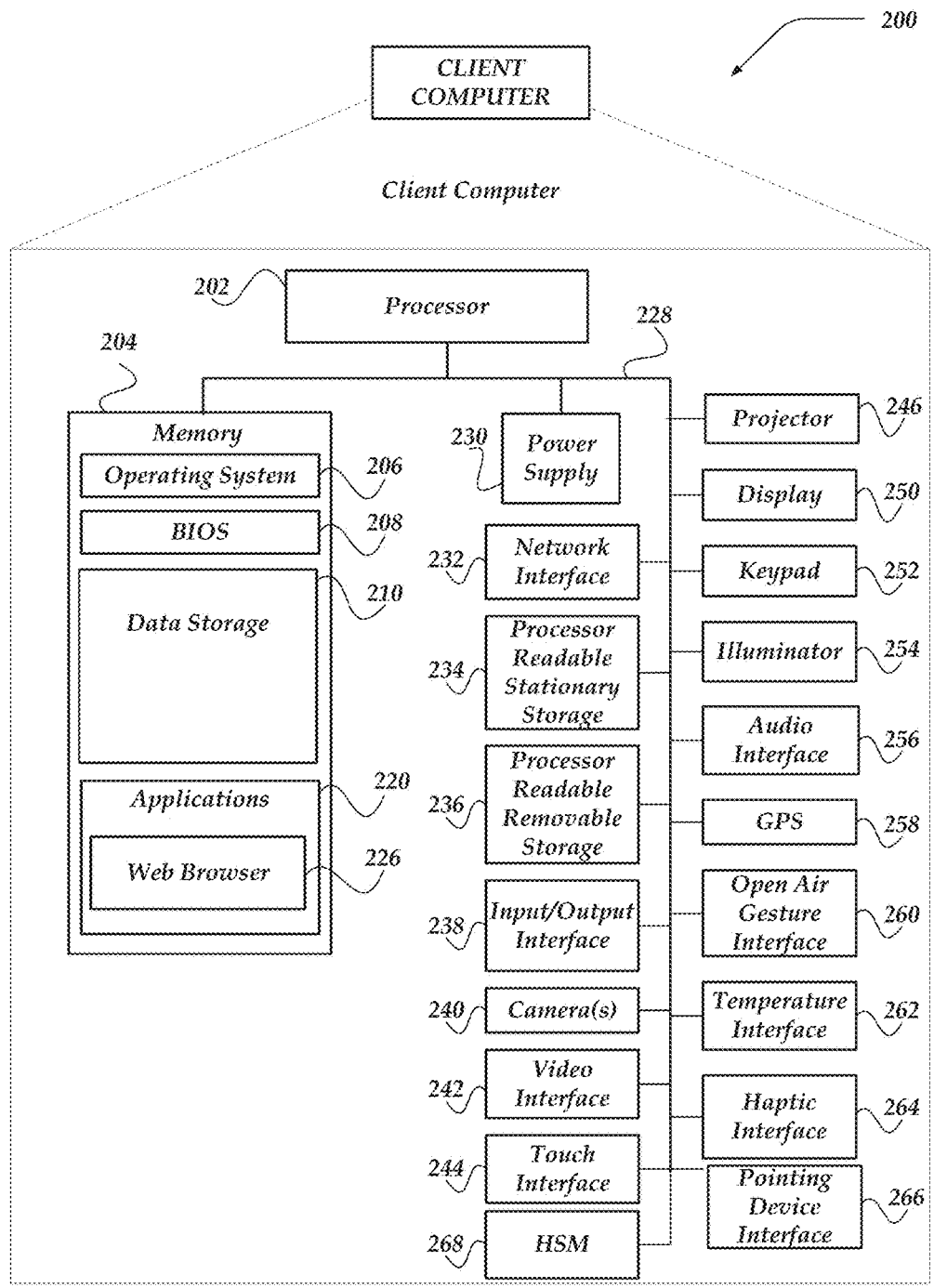
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers 102-105 shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice.

For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. Web browser 226 may be used to configure routes on management platform server computer 116, as discussed below in conjunction with FIG. 3. For example, a user may operate web browser application 226 in order to enable a first group of node computers to communicate with the second group of node computers through one or more gateway computers or relay computers.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, web browser 226. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
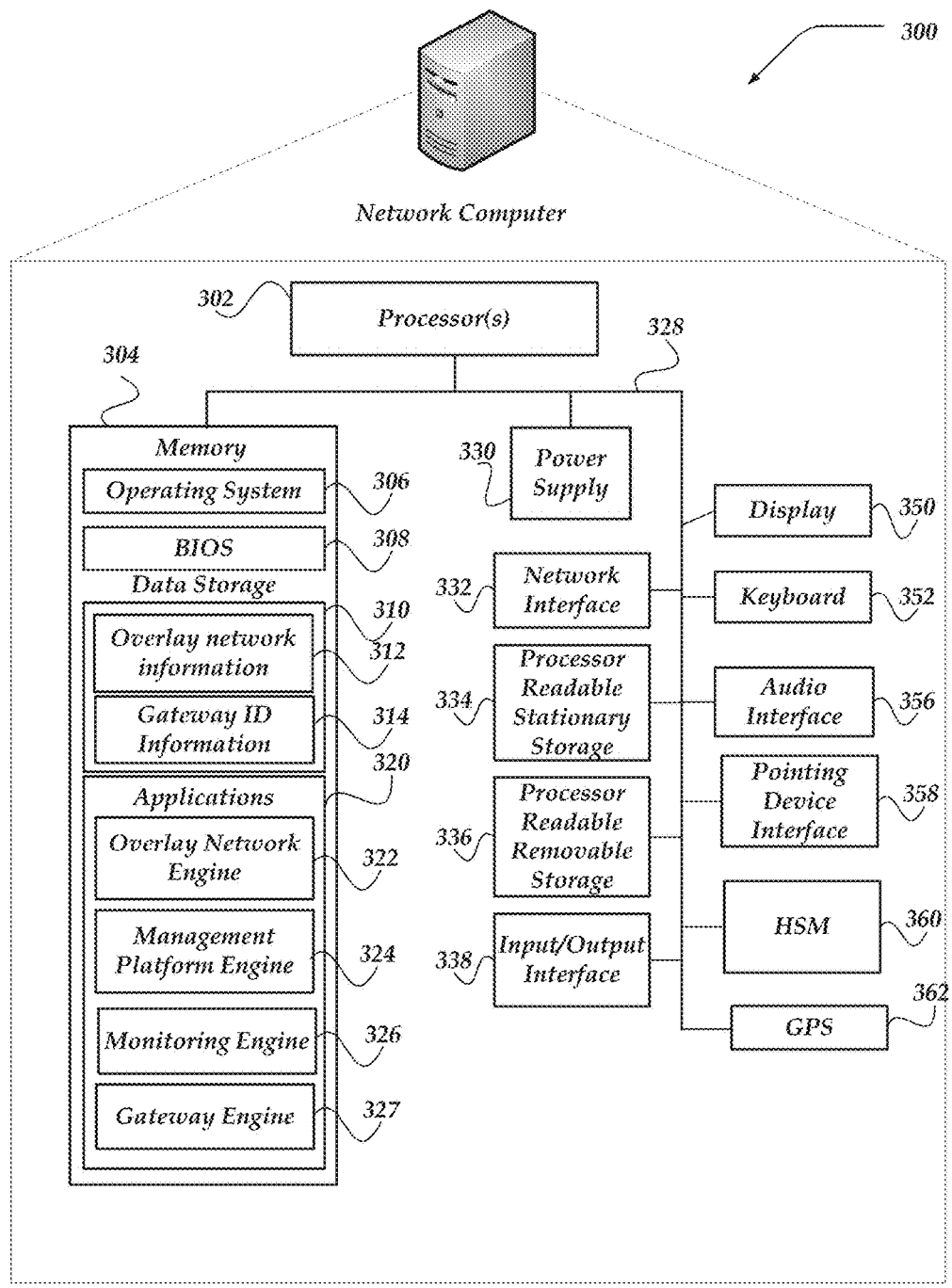
FIG. 3 shows one embodiment of a network computer, in accordance with at least one of the various embodiments.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of one or more of management platform server computer 116, gateway computers 118, relay computers 120, or one or more node computers 122 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Data storage 310 may include, for example, overlay network information 312, gateway ID information 314, or the like. Overlay network information 312 may contain policy data defining which gateways, relays, or node computers are allowed to communicate with each other as well as the physical network routes that may be available. In one embodiment, overlay network information 312 may be generated and stored on management platform servers, such as, management platform server computer 116 before being distributed to gateway computers 118 and relay computers 120.

Data storage 310 may also include gateway identifier information 314 that may include information for identifying the gateway computer endpoints of for connection routes. A network address (e.g., IP address and port) for a given gateway computer may be discovered by an relay computer when the gateway computer initiates a connection to the relay computer. In scenarios when a gateway computer is located in a private network a public facing network address for that gateway computer may not be knowable unless the gateway computer initiates a connection outside of the private network.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network engine 322, management platform engine 324, monitoring engine 326, or gateway engine 327 which may be enabled to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 306, overlay network engine 322, management platform engine 324, monitoring engine 326, gateway engine 327, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes or databases. In at least one of the various embodiments, geo-location information used for selecting localization information may be provided by GPS 362. Also, in some embodiments, geolocation information may include information provided using one or more geolocation protocols over the networks, such as, wireless network 108 or network 110.

Furthermore, in at least one of the various embodiments, overlay network engine 322, management platform engine 324, monitoring engine 326, gateway engine 327, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to overlay network engine 322, management platform engine 324, monitoring engine 326, gateway engine 327, or the like, may be provisioned and de-commissioned automatically. Also, in at least one of the various embodiments, overlay network information 312, gateway identifier information 314, or the like, may located in virtual servers running in a cloud-based computing environment rather than being tied to one or more specific physical network computers. In some embodiments, various applications, data storage, or the like, may be operative in one or more container computers executing in a container computing environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Logical System Architecture

Figure 4:
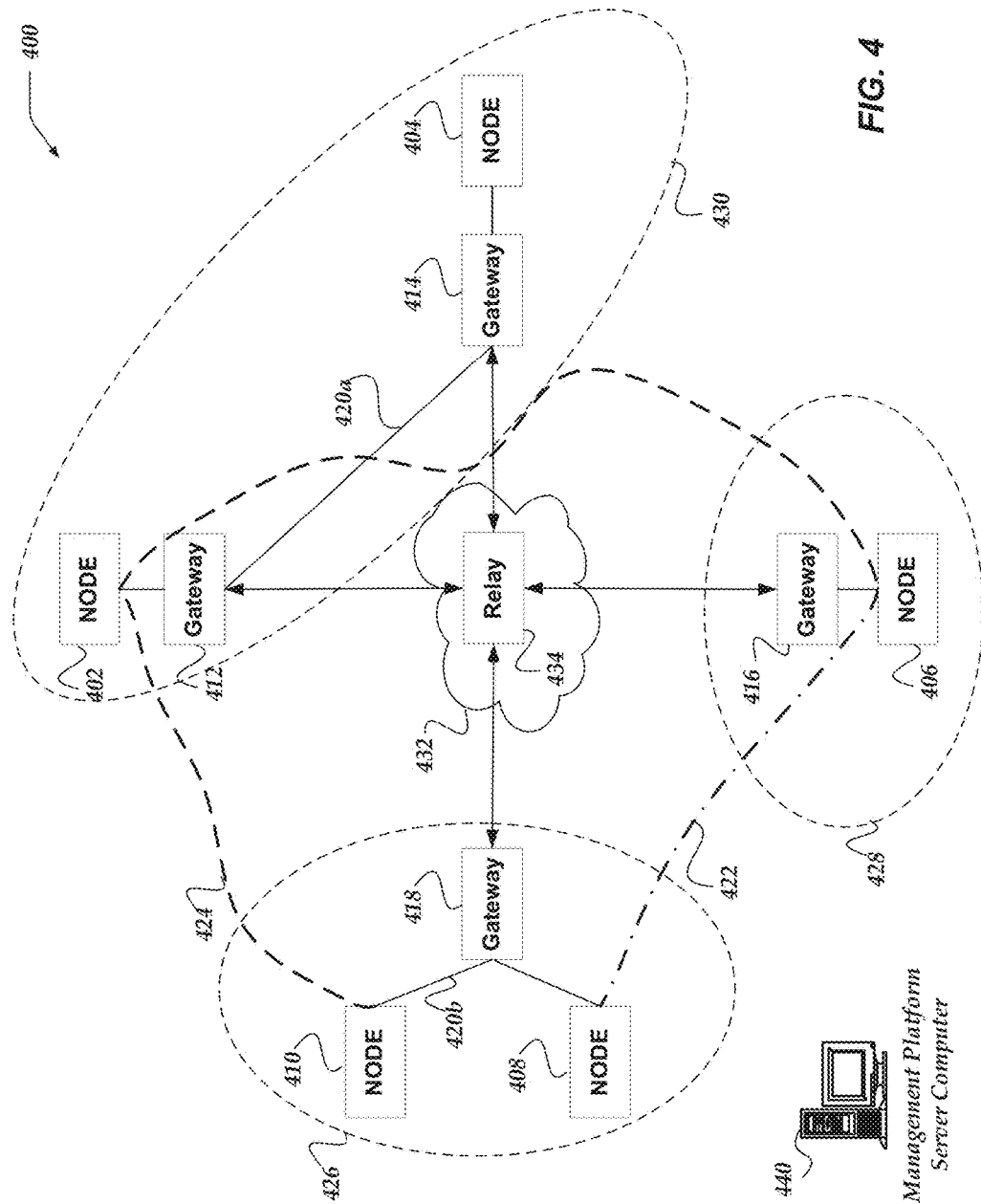
FIG. 4 illustrates a logical schematic of a network that includes overlay networks, node computers, gateway computers, relay computer in accordance with at least one of the various embodiments.

FIG. 4 illustrates a logical schematic of network 400 that includes overlay networks, node computers, gateway computers, relay computer in accordance with at least one of the various embodiments. Network 400 is arranged to include gateway computers, such as, gateway computers 412-418. Gateway computers may be disposed between one or more node computers and the underlying physical network infrastructure. In at least one of the various embodiments, the gateway computers may be arranged such that they isolate node computers, such as, node computers 402-410 from the physical network used to interconnect them. Also, in this example, management platform server computer 440 represents one or more management platform servers that may be assumed to be arranged to communicate over one or more networks with relay computers and gateway computers that comprise network 400. In one or more of the various embodiments, among other things, management platform server 440 may be arranged to manage the configuration or distribution of policy information.

In this example, physical networks, such as, physical network 420a, physical network 420b, a public network 432 provide an underlying physical network comprising network 400. In this example, node computer 404 is isolated from physical network 420a by gateway 414.

Also, in one or more of the various embodiments, private networks, such as, private network 426, private network 428, or private network 430 may represent separate or isolated networks that may be configured to prevent computers them from being visible or directly accessible from outside each of the private networks.

In some embodiments, gateway computers may be arranged to communicate with one or more relay computers, such as, relay computer 434 via another network, such as, network 432. In some embodiments, relay computer 434 may be arranged to have a network address that may be visible from computers that may be part of other networks, including private networks, such as, private network 420a and private network 420b, or the like.

Accordingly, in at least one of the various embodiments, the gateway computers may be configured to provide or enforce one or more overlay networks in network 400. In this example, for some embodiments, overlay network 422 enables node computer 406 and node computer 408 to "see" each other on the network; communication from node computer 406 to node computer 408 may be routed through gateway computer 416 to network 432 to relay 434 to gateway computer 418; and the communication may then be routed from gateway computer 418 to node 408 over private network 420b. From the point-of-view of node computer 406 and node computer 408 the communication appears to go directly over overlay network 422. In actuality the communication will be routed from node 406 to gateway computer 416 to relay 432 to gateway computer 418.

Likewise, in this example, network 400 may be arranged such that node computer 402, node computer 406, and node computer 410 communicate over overlay network 424. As described above, in at least one of the various embodiments, the communication among/between the nodes on overlay network 424 may be routed through relay 434 and two or more of the gateway computers.

In at least one of the various embodiments, the gateway computers may be configured with one or more rule-based policies that determine access or restrictions for network communication on the networks. The particular rules or restrictions associated with how communication information (e.g., network packets) should be routed through the overlay network may be established by a management platform computer, such as management platform server computer 440, or the like. Configuration information may be pushed (e.g., router tables, or the like) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. Accordingly, if a node computer, such as, node computer 410 is in gateway computer 418's list of allowed computers (e.g., a whitelist) it may be enabled to initiate communication over the overlay network through gateway computer 418. Conversely, node computers, or any other computer for that matter, not in a gateway computer's whitelist may be denied access to that gateway computer and the overlay networks. Though, in some embodiments, a node computer may be allowed to access one or more particular gateway computers and denied accessed to others. In at least one of the various embodiments, a management platform computer, such as, management platform server computer 440, may be arranged to manage and distribute the whitelists to the one or more gateway computers.

In at least one of the various embodiments, by placing gateway computers between physical networks (e.g., private network 420a or private network 420b) and the node computers, the configuration or definition of one or more overlay networks may be accomplished without requiring the individual node computers to be reconfigured. Further, in at least one of the various embodiments, gateway computers may comprise security hardened computers that provide various routing, security or cryptography features to help secure the one or more networks. Otherwise, in at least one of the various embodiments, the network may be reliant on the security features of the node computers themselves which may be non-existent or very limited.

In some embodiments, gateway computers may include more than one gateway links each providing access to one or more networks. In one or more of the various embodiments, gateway links may be arranged to provide secure or redundant access to one or more networks. In some embodiments, one or more gateway links may be have access to one or more networks not available or accessible to some or all of the other gateway links.

In at least one of the various embodiments, overlay networks may be enforced by using one or more overlay whitelists that define the endpoints (e.g., node computer, gateway computers, relays computers, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, management platform computer 440 may be arranged to manage and distribute the overlay whitelists to each gateway computer comprising an overlay network.

In some embodiments, computers in different networks may be unable to identify or access each other because their local networks are using separate (perhaps conflicting) network address namespaces. For example, gateway computer 418, and consequently, node computers 408 and 410, cannot be accessed from outside of the private network 420b without gateway computer 418 first initiating a connection outside of private network 420b. This may be true even if a public network address associated with private network 420b is known because the network address of node computers in private networks, such as, private network 420b are not generally available to computers outside of the same private networks.

In some embodiments, relay computers, such as relay computer 434, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can see the other, because they are both located in separate private networks, one or more relay computers, such as, relay computer 434 may be employed to bridge the networks to enable node computers in one network to reach node computers in another network.

In one embodiment, a gateway computer may be arranged to send an initial connection request packet to a relay computer. In some embodiments, the initial packet may include at least a gateway identifier (GID) of the source gateway computer and a GID of the target gateway computer. The relay may authorize or facilitate communication between the source gateway computer and the target gateway computer based on policy information received from management platform server 440. Once authorized, relay 434 may participate in the establishment and maintenance of the connection with the target gateway computer by forwarding the "I1" initiator packet to the target gateway computer, while continuing to forward control packets between the source and target gateway computers.

In one or more of the various embodiments, control packets may include handshake packets such as initiator 1, responder 1, initiator 2, and responder 2, or the like, to established connections between gateway computers. Other control packets may include keep-alive packets that are sent from a gateway computer to a relay computer.

For example, gateway computer 418 may send an "I1" packet to relay 434 over network 432 where the "I1" packet includes a gateway identifier (GID) associated with gateway computer 418 as the source and a GID identifying gateway computer 414 as the target. If relay 434 has established a connections with gateway computer 414, relay 434 will have already obtained and indexed information, such as, ingress identifier to use for routing packets to gateway computer 414, such as, a security parameter index (SPI) associated with the connection to gateway 414, as well as, a network address (or other tuple information) for accessing gateway 414. In some embodiments, relay 434 may obtain information from network packets sent by gateway 418 to obtain information for identifying or associate network packets or network flows with gateway 418, such as, an SPI associated with the connection to gateway 418, as well as, a network address (or other tuple information) for accessing gateway 418. If network addresses of both gateway computers are known and indexed by relay 434, relay 434 may be arranged to employ this information to forward handshake packets between them. However, in this example, if relay 434 has not received an initialization packet from gateway computer 414, relay 434 may be arranged to drop the "I1" request. In one or more of the various embodiments, relay 434 may continue dropping request to communicate with gateway 414 until relay 434 has obtained and indexed gateway computer 414's identification information (e.g., ingress identifier, network address information, or the like).

In one or more of the various embodiments, a gateway computer, such as, gateway computer 418, or the like, may broadcast requests to establish a connection to a target gateway computer to multiple relays. For example, gateway computer 418 may broadcast an "I1" packet to two or more relays. This broadcast technique performs the process discussed above to attempt to establish a connection with the two or more relays independently and in parallel. In one embodiment, the relay computer selected by the gateway computer may be the first relay computer to complete the handshake process. Further, in some embodiments, additional criteria or conditions may be applied to select a relay computer from among two or more available relay computer.

In one embodiment, management platform servers, such as, management platform server 440 may be arranged to enable users or operators to create relay policy rules. For example, a relay policy rule may define that gateway computer 418 may communicate with gateway computer 414 via relay 434. In some embodiments, relay policy rules may be defined in terms of groups of gateway computers or groups of relays.

In one or more of the various embodiments, if connections may be routed through one of a plurality of relays, these connections may be actively balanced to improve throughput, latency, and cost efficiency. In one embodiment, an overburdened relay may simply drop a connection. For example, if gateway computer 418 is connected to gateway computer 414 through relay 434, and relay 434 drops the connection, gateway computer 418 may attempt to use another relay computer allowed by the current policy rules. Additionally or alternatively, relays that are overburdened with connections may artificially delay processing new initialization packets to enable faster responding relay computers to establish connections with the requesting gateway computers. For example, before forwarding an "I1" packet on to a destination gateway computer, an overburdened relay may insert a delay that causes the route through that particular relay to appear to be slow, making it less likely that a route using the overburdened relay will be chosen.

In one or more of the various embodiments, while gateway computers may be stationary on a network, in that they maintain the same network address indefinitely, the network address for a gateway computer may change from time to time. For example, a gateway computer may be moved to a different location, e.g. to another building on a corporate campus that is associated with a different range of network addresses. Similarly, a gateway that is a mobile device such as a smart phone may pass between cell towers or access points, each of which may be associated with a different network addresses. In one or more of the various embodiments, gateway computers may also experience a change in network address if the network changes, e.g. if a new internet service provider (ISP) is introduced. However it happens, if a network address associated with a gateway computer changes, any existing connections using that network address will be dropped. However, because identity based networking does not rely on a host's location as identity, the connection can be seamlessly re-established if management platform server 440 discovers the change and broadcasts the new network address for the gateway computer. For example, if gateway computer 416 determines that its network address has changed, it will notify its associated management platform server of the change. In one or more of the various embodiments, the management platform server may then broadcast updated policies that include rules for the new network address. Accordingly, in one or more of the various embodiments, an existing connection between gateway computer 416 and gateway computer 412 through relay 434 may continue once relay 434 receives an updated policy from management platform server 440.

It is also possible for a device, such as one of nodes 402, 404, 406, 408, or 410, to be moved to a different gateway computer. In this scenario, management platform server 440 has to be notified of the new configuration before the node is to work again properly. For example, if node 410 were moved from private network 420b to private network 420a, management platform server 440 could be informed, either manually or automatically, and then update relevant relays with new policies. Existing connections may time-out or reset automatically, when it is discovered that endpoint no longer exists at the network address the connection is directed towards. Once a connection has timed-out or reset, a new connection may be initiated and the connection between endpoints may continue uninterrupted.

Figure 5:
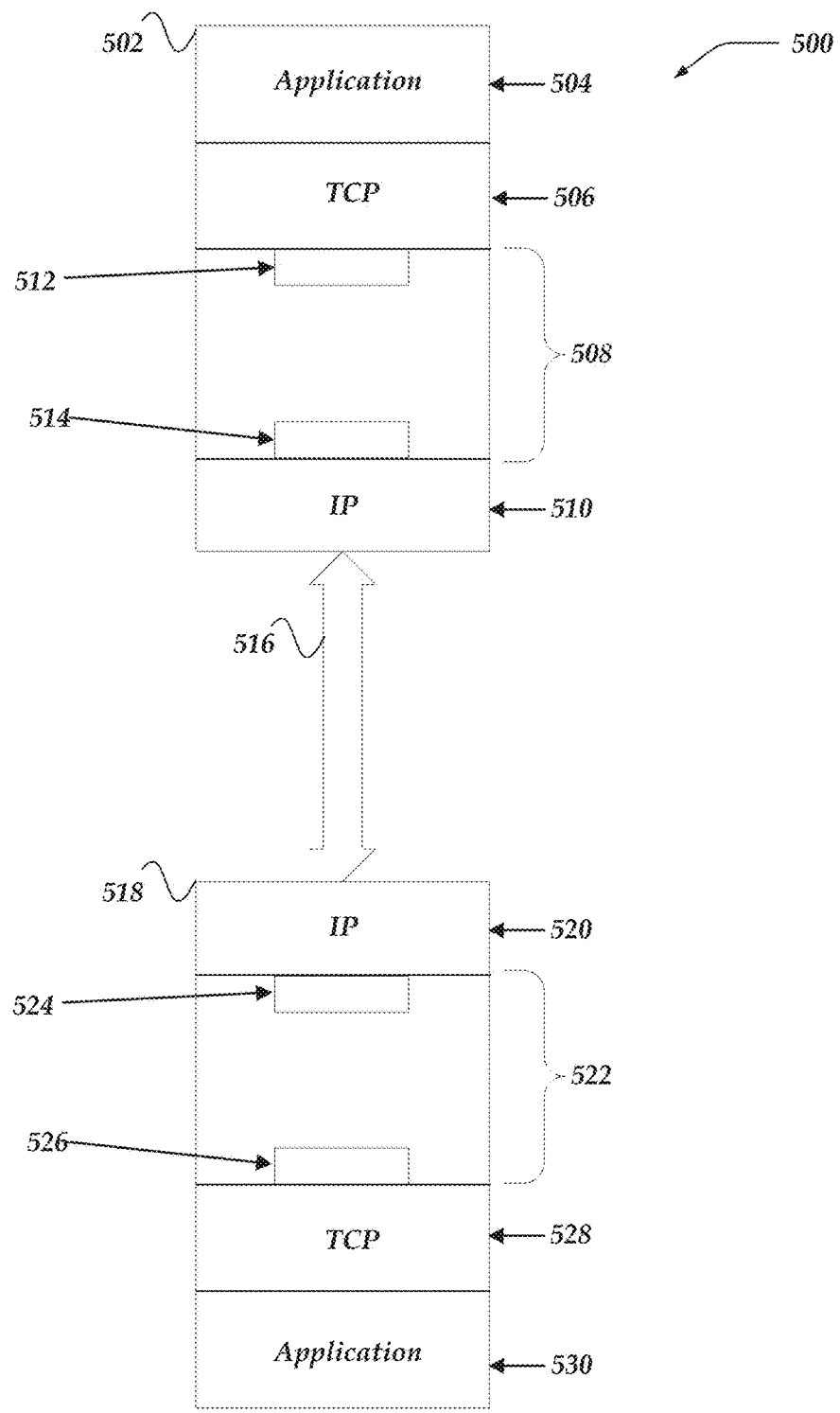
FIG. 5 illustrates a logical representation of a system for communicating in a network in accordance with at least one of the various embodiments.

FIG. 5 illustrates a logical representation of system 500 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 502 may be arranged such that an application layer, such as, application layer 504 may perform actions that include communication; next at layer 506, one or more standard network protocols APIs (TCP in this example) may be employed; at layer 508 one or more special actions may be performed to support the overlay networks. And, before the communication is sent out, the lower level layers, such as, layer 510 (IP layer in this example) may be applied.

In at least one of the various embodiments, gateway computers may be arranged to substitute their GID for use as a network address by higher layers such as application layer 504 and TCP layer 506. The GID may be arranged to be compatible with the native data structures that may be used to represent actual network addresses. Accordingly, in at least one of the various embodiments, application level networking API's that accept network address data structures as parameters may be enabled to accept GID instead. For example, in some embodiments, an internet address may be represented using a 32-bit value. Thus, in such embodiments, the GID may be a 32-bit number, making it size compatible with an ordinary network address value.

In at least one of the various embodiments, at the gateway layer, layer 508 in FIG. 5, the GID of the source gateway or the target gateway are mapped to an actual network address. In at least one of the various embodiments, component 512 may represent components that are arranged to map GIDs to network addresses, and component 514 may represent components that are arranged to map from a network address to a GID.

In at least one of the various embodiments, since the GIDs may be mapped to an actual network address, a network layer, such as IP layer 510 may generate the appropriate network protocol information for the communication. Accordingly, in at least one of the various embodiments, network path 516 may be employed to communicate the communication network packets to its next destination.

In at least one of the various embodiments, communication 518 represents the received version of communication 502. The network protocol layer (IP layer 520) accepts the communication over the network; gateway layer 522 employs component 524 and component 526 to map network addresses to GIDs; TCP layer 528 performs higher level network protocol actions using the GID in place of the network address; and application layer 530 employs the payload of the communication to perform application specific actions based on the actual contents of the payload.

Figure 6:
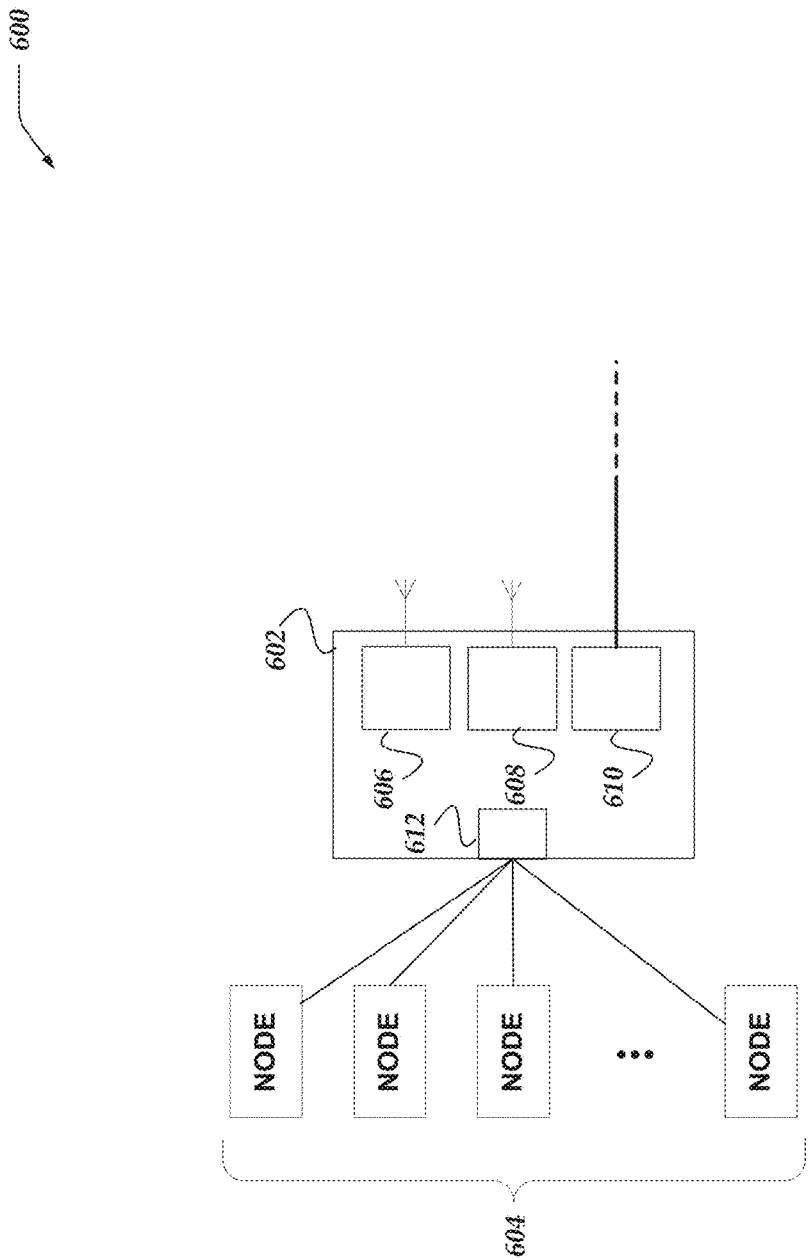
FIG. 6 illustrates a logical representation of a system that include multiple gateway links in accordance with one or more of the various embodiments.

FIG. 6 illustrates a logical representation of system 600 that include multiple gateway links in accordance with one or more of the various embodiments. In this example, gateway computer 602 may be arranged to provide gateway services for one or more nodes, such as, nodes 604.

In one or more of the various embodiments, gateway computers may be arranged to include two or more interfaces that make its gateway links, such as, interface 606, interface 608, interface 610, or the like, for communication over two or more communication links. Also, in some embodiments, node computers 604 may be arranged to communicate with gateway computer 602 over one or more interfaces, such as, interface 612.

In one or more of the various embodiments, gateway computer 602 may be arranged to include multiple interfaces for communicating over multiple gateway links that may be associated with a different network addresses. In some embodiments, gateway links may be radio based (e.g., cellular, Wi-Fi, Bluetooth, wave guides, or the like), wired based (e.g., Ethernet, or the like), optical based, or the like. In this example, gateway computer 602 includes two radio based interfaces (e.g., interface 606 and interface 608) and one wired interface (e.g., interface 610) for communication to other gateway computers or relay computers that may comprise one or more networked computing environments. In one or more of the various embodiments, in this example, interface 606 may represent a radio that is configured to communicate using one cellular provider network and interface 608 may be arranged to communicate using another cellular provider network.

In one or more of the various embodiments, gateway computers may be arranged to perform one or more monitoring actions to evaluate the gateway links. In some embodiments, the monitoring actions may include active or passive operations that may collect one or more performance metrics that may be used to evaluate the gateway links. In some embodiments, monitoring engines may be arranged to select the particular monitoring actions used to evaluate a given gateway link based on policy rules, configuration information, user input, or the like, or combination thereof.

In one or more of the various embodiments, one or more monitoring actions may be associated with particular node computers, gateway computers, relay computers, management computers, or the like. In some embodiments, one or more of the monitoring actions may be associated with applications, content-type, content-size, content priority, content importance, source/target address combinations, communication protocols, day or date, time-of-day, or the like, or combination thereof.

In one or more of the various embodiments, monitoring may include passively collecting metrics while a gateway link is in use or otherwise servicing active communication sessions. Accordingly, while a given node computer is using a gateway link to communicate via the gateway computer, a monitoring engine may be arranged to collect one or more of the various metrics.

Also, in one or more of the various embodiments, one or more monitoring engines may be arranged to perform active monitoring actions that include, pings, upload/download speed tests, trace routes, or the like.

In one or more of the various embodiments, monitoring engines may be arranged to receive OSI layer 2 notifications. For example, in some embodiments, Layer 2 notifications may be provided as input to a monitoring engine if an Ethernet cable is unplugged or a switch port is shut down, or the like.

In one or more of the various embodiments, a gateway computer may be arranged to use two or more gateway links to communicate information associated with the same session. In some embodiments, the multiple gateway links may be used to provide increased bandwidth or provide increased reliability. In the case of increased bandwidth, a gateway engine may be arranged to split network traffic associated with one node computer across multiple gateway links. The sending source gateway may take a single stream of traffic from one node computer and split it across two or more gateway links. And, then the target may be arranged to combine the partial stream received over two or more gateway links into a single stream that is communicated to the target node(s). Accordingly, gateway computers that support gateway link splitting may be arranged to include cache memory that may be used to buffer full stream until they may be split or to cache partial streams so they may be reassembled into a single stream.

In one or more of the various embodiments, relay computers may be arranged to receive one or more streams (or partial streams) on one type of gateway links and then relay the streams on different gateway links. In general relay computers may employ their own monitoring engine to evaluate the various interfaces or gateway links that a given relay computer may support.

In one or more of the various embodiments, the monitoring engine may be arranged to associate a quality or cost score (e.g., preference scores) with each gateway link. In one or more of the various embodiments, such scores may be associated with a value, such as, 0-100, or A, B, C, etc. that correlate with the performance of a gateway link. Also, in some embodiments, preference scores may be associated other information, such as, confidence scores, metric values (e.g., last measured values), time values (e.g., monitoring date/time), or the like.

In one or more of the various embodiments, monitoring engines or gateway engines may be arranged to execute one or more rules or policies that may influence the score associated with a given gateway link. For example, a rule may define that interface 606 is reserved for a certain class or type of traffic.

In one or more of the various embodiments, if a gateway engine determines that it should use a different gateway link for a given communication, it may update the one or more management computers it may be associated with. Accordingly, in some embodiments, the management computers may then update the data used for routing traffic to a gateway, such as, white lists, routing tables, connection tables, or the like.

In one or more of the various embodiments, because gateway computers are identified using gateway identifiers (GIDs), changing the gateway link information does not invalidate or otherwise disrupt the management of overlay network. Gateway link changes may cause other gateway computers, relay computers, or the like, to make one or more adjustments that may be associated with the underlying networks, but the overlay network may appear to be unchanged to the node computers.

Generalized Operations

FIGS. 7-10 represent the generalized operation of multi-link network gateways with monitoring and dynamic failover in accordance with at least one of the various embodiments. In at least one of the various embodiments, processes 700, 800, 900 and 1000 described in conjunction with FIGS. 7-10 may be implemented by or executed on one or more processors of a relay computer, a gateway computer, or a management platform server, such as network computer 300 of FIG. 3. In other embodiments, these processes, or portions thereof, may be implemented by or executed on one or more processors of a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 7-10 may be used for multi-link network gateways with monitoring and dynamic failover in accordance with at least one of the various embodiments or architectures such as those described in conjunction with FIGS. 4-6. Further, in at least one of the various embodiments, some or all of the action performed by processes 700, 800, 900, or 1000 may be executed in part by overlay network engine 322, management platform engine 324, monitoring engine 326, gateway engine 327, or the like, or combination thereof.

Figure 7:
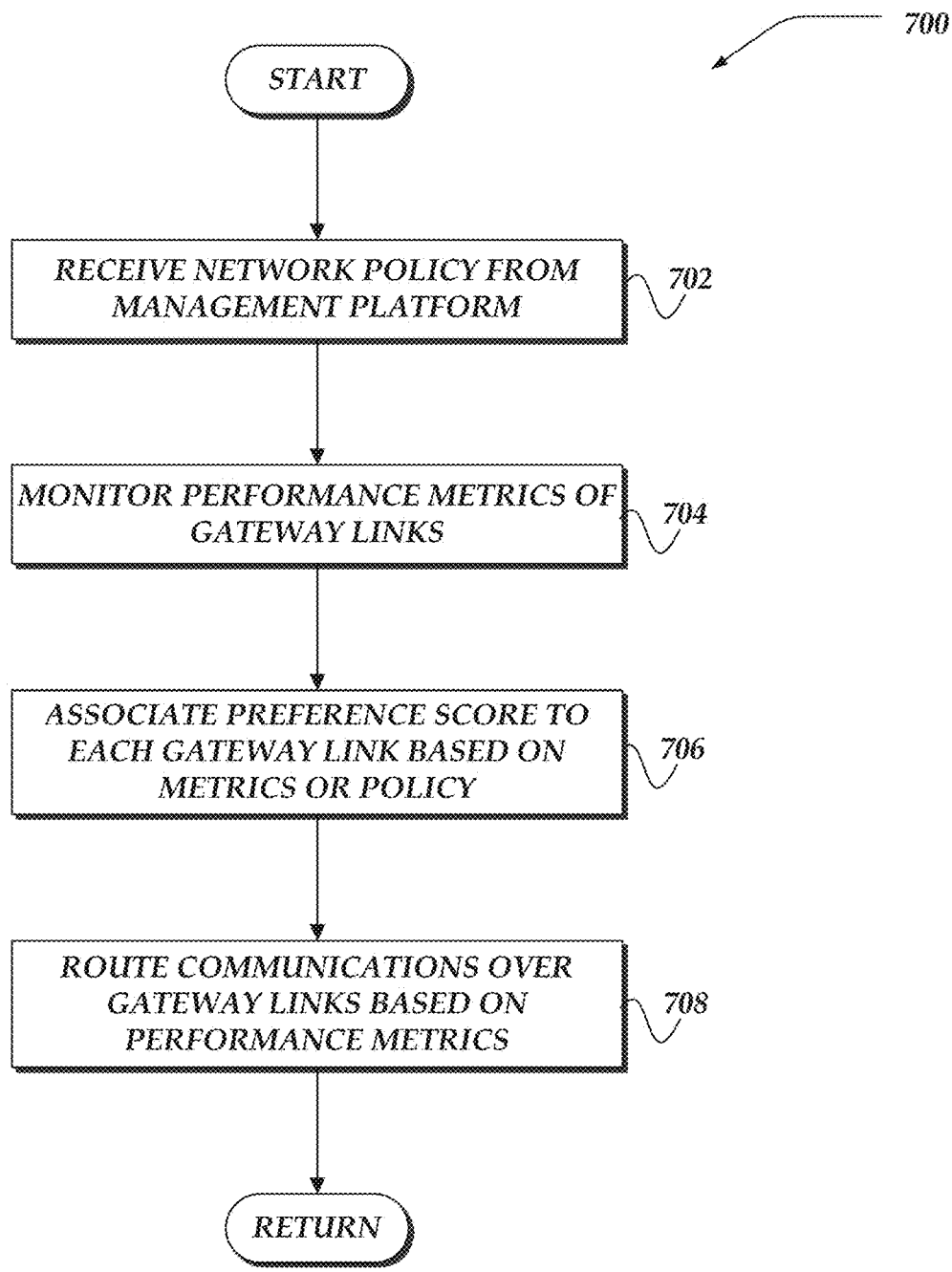
FIG. 7 illustrates an overview flowchart of a process for multi-link network gateways with monitoring and dynamic failover in accordance with at least one of the various embodiments.

FIG. 7 illustrates an overview flowchart of process 700 for multi-link network gateways with monitoring and dynamic failover in accordance with at least one of the various embodiments. In one embodiment, process 700 may be implemented by gateway computers 118 or relay computers 120 of FIG. 1, or the like. After a start block, at block 702, in at least one of the various embodiments, overlay network policy may be obtained from a management platform server, such as, management platform server computer 116 of FIG. 1. In one or more of the various embodiments, the policy may define allowed routes between gateway computers, e.g. a whitelist of allowed connections. In one embodiment the pairs of gateway computers are denoted by pairs of gateway identifiers (GIDs). In some embodiments, a GID may comprise a 128 bit cryptographic hash of a public keys or other cryptographic keys that may be associated with a gateway computer.

At block 704, in one or more of the various embodiments, a monitor engine may be arranged to monitor one or more performance metrics that may be associated with one or more gateway links. In one or more of the various embodiments, one or more gateway computer may include monitoring engine that may be arranged to execute various performance monitoring actions to evaluate the quality or health of each gateway link of the gateway computer. As discussed herein, some monitoring actions may be specific to a particular gateway link or type of gateway link. Also, in one or more of the various embodiments, some monitoring actions may be specific for a particular type of content, source/destination, time of day, or the like.

In one or more of the various embodiments, the one or more monitoring actions may produce one or more performance metrics that may be used to generate preference scores for one or more gateway links. In some embodiments, gateway engines may be arranged to consider preference scores if determining which gateway links to use for pending or impending communication.

At block 706, in one or more of the various embodiments, the monitoring engine or a gateway engine may be arranged to associate a preference score to the one or more gateway links. In some embodiments, the preference score for each gateway link may be determined based on the one or more performance metrics, one or more rules, configuration information, or the like, or combination thereof. In one or more of the various embodiments, preference scores may be live values that are updated based on current performance metrics, policy rules, or the like.

At block 708, in one or more of the various embodiments, the gateway engine may route communications over one or more gateway links based on the preference score associated with the one or more gateway links. In one or more of the various embodiments, if a communication from a source node is provided to a gateway engine, the gateway engine may select the gateway link to use. In some cases, gateway engines may be arranged to maintain an active gateway link that may be used for communicating with other nodes, gateway computers, relay computers, management platform servers, or the like. In some embodiments, some communications may have requirements or restrictions that force a gateway engine to use a particular gateway link. Thus, in some embodiments, the gateway engine may switch that particular gateway link irrespective of its preference score. Next, control may be returned to a calling process.

Figure 8:
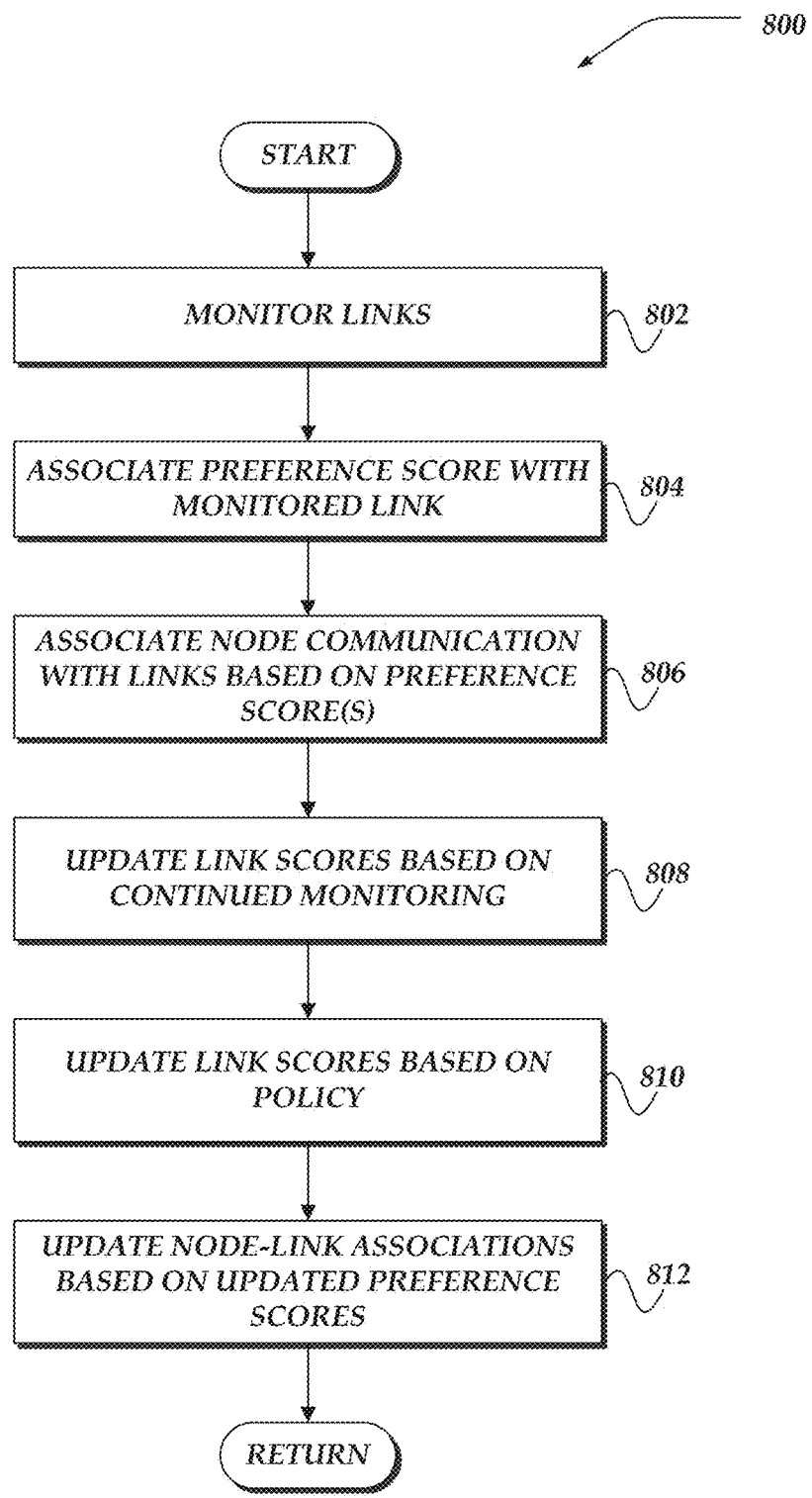
FIG. 8 illustrates a flowchart of a process for multi-link network gateways with monitoring and dynamic failover in accordance with at least one of the various embodiments.

FIG. 8 illustrates a flowchart of process 800 for multi-link network gateways with monitoring and dynamic failover in accordance with at least one of the various embodiments. After a start block, at block 802, a monitoring engine may monitor one or more gateway link of a gateway computer. In one or more of the various embodiments, the monitoring engine may be arranged to perform various network monitoring actions to collect performance metrics associated with one or more of the gateway links of a gateway computer. In one or more of the various embodiments, one or more of the monitoring actions may include conventional network health monitoring actions, such as, pings, traceroutes, packet drops, connection count, send or receive errors, send/receive rates, send/receive totals, or the like. Further, in one or more of the various embodiments, performance metrics may include tracking network statistics associated with particular node computers, content types, times-of-day, day-of-weeks, or the like.

In some embodiments, monitoring engines may be arranged to employ one or more custom monitoring actions that are tailored for testing particular conditions or collecting particular metrics that may be unique or otherwise related to a particular organization, application, network configuration, policy, or the like. These customer monitoring actions may be encoded using computer languages or built-in to one or more hardware components.

At block 804, in one or more of the various embodiments, preference scores may be associated with the monitored gateway links. In one or more of the various embodiments, monitoring engines or gateway engines may be arranged to provide preference scores for the one or more gateway links based on the performance metrics. In some embodiments, preference scores may be computed using formulas that include weights or averages of the collected performance metrics, such as, $S=(Ax_1+Bx_2+Nx_n)/n$. In one or more of the various embodiments, the particular formula, weights, ranges, or the like, may be obtained from configuration information, user input, or policy rules. For example, some embodiments may use formulas that produce preference scores having values from 1-100 where 100 is most preferred, while other embodiments, may use formulas the produce preference scores having values 0.0-1.0 where 1.0 is most preferred, and so on.

At block 806, in one or more of the various embodiments, node communication (e.g., network traffic) may be associated with one or more gateway links based on one or more preference scores or policy rules. In one or more of the various embodiments, a gateway engine may select a gateway link based on the preference scores. In some embodiments, the gateway engine may select a gateway link that has the highest preference scores.

Accordingly, in one or more of the various embodiments, if a node computer is communicating to other computers via its gateway computer, the gateway engine may associate the network traffic comprising the communication with the selected gateway link and use that gateway link to send or receive the network traffic comprising the communication. In one or more of the various embodiments, the gateway engine may be arranged to split the communication across more than one gateway links. In some embodiments, gateway computers may be arranged to use or have one active gateway link at a time.

In one or more of the various embodiments, gateway engines may be arranged to apply configuration information, policy rules, user-input, or the like, to determine the gateway link that may be used. In some embodiments, the preference scores associated with one or more gateway links may be used as part of this determination. Also, in some embodiments, one or more policy reasons may influence which gateway link is used for a given communication. Also, in some embodiments, some gateway links on a gateway computer may have access to different networks, network portions, or the like. Thus, in some embodiments, if a target node for a pending communication is unreachable via certain gateway links, those gateway links may be excluded from consideration even if they have higher preference scores.

At block 808, in one or more of the various embodiments, the monitoring engine or a gateway engine may be arranged to update one or more preference scores for the one or more gateway links based on continued monitoring of the one or more gateway links. In one or more of the various embodiments, continuous monitoring may provide additional performance metrics or updates to previously measured metrics. In some embodiments, baseline metric values, performance models, or the like, may also be updated continuously. In one or more of the various embodiments, gateway engines may be arranged to use the sampling/update periods determined via configuration information or one or more policy rules.

At block 810, in one or more of the various embodiments, the monitoring engine or gateway engine may be arranged to update one or more preference scores for the one or more gateway links based on one or more policies. In some embodiments, one or more preference scores may be dependent or related to other factors that are not measured or measurable by monitoring, such as, cost, priority, or the like. Accordingly, in one or more of the various embodiments, monitoring engines or gateway engines may be arranged to adapt preference scores based on policy rules. For example, in some embodiments, a given gateway link may be less expensive to use during the off-peak hours. Accordingly, in this example, the preference score for such gateway links may be reduced during more expensive peak hours and increased during less expensive off-peak hours. Also, for example, in some embodiments, one or more gateway links may be associated with graduated costs based on one or more metered metrics, such as, data caps, data quantity, bandwidth, utilization levels, or the like. Accordingly, for example, as a gateway link becomes more expensive over a given time period, its preference score may be reduced.

At block 812, in one or more of the various embodiments, the gateway engine may be arranged to update or modify one or more node-link associations based on the updated preference scores. In one or more of the various embodiments, gateway engines may be arranged to monitor preference scores to identify whether to change from one or more active gateway link to another. In some embodiments, if the gateway engine determines that a different gateway link should be activated, it may deactivate the current active gateway link and activate the other gateway link.

In one or more of the various embodiments, gateway engines may be arranged to employ configuration information or policy rules to define one or more of the conditions that may initiate a change of active gateway links. In some embodiments, the one or more rules may include criteria that provide hysteresis to avoid excess gateway link switching (or thrashing). For example, a rule may be defined to change gateway links only if the higher scoring gateway link has a preference score that is 20% higher than the current active gateway link.

In one or more of the various embodiments, the rules for changing active gateway links may depend on the communication that is pending or impending. For example, in some embodiments, if the impending communication is determined to be high priority, the criteria for selecting a different gateway link may be modified. Further, in some embodiments, in some cases, the active gateway link may be inappropriate or otherwise disabled from effectively servicing a given communication (e.g., the target node may be unreachable via the current active gateway link). Accordingly, in some embodiments, a gateway engine may be arranged to change gateway links even if the current active gateway link is healthy.

In one or more of the various embodiments, one or more gateway link changes may be caused or associated with unexpected performance degradations or errors associated with one or more gateway links. Accordingly, in one or more of the various embodiments, gateway computers may be arranged to generate, provide, or forward, one or more alert messages or events that may be arranged to communicate one or more of the underlying reasons for the gateway link to the management platform computer. The information provided by the alerts or events may be logged or provided to one or more responsible users. For example, in some embodiments, if the gateway link changes because one of two cellular radios on a gateway computer has failed, responsible users may be notified to enable them to take actions to repair or replace the failed cellular radio.

Likewise, in one or more of the various embodiments, alerts or events may be provided to enable link usage to tracked for managing costs or other usage resources that may be associated with different links. In some embodiments, informing users of the underlying reasons for the gateway link changes may enable users to modify preference score criteria or rules to reduce undesirable changes. For example, if users determine that the monitoring engine is selecting costly gateway links to often, a user may modify one or more of the preference score rules to reduce the number of times the costly gateway link is selected. For example, one or more switch-over threshold values may modified to allow cheaper links to be preferred over expensive links even though there is some level performance degradation on the cheaper links.

Next, control may be returned to a calling process.

Figure 9:
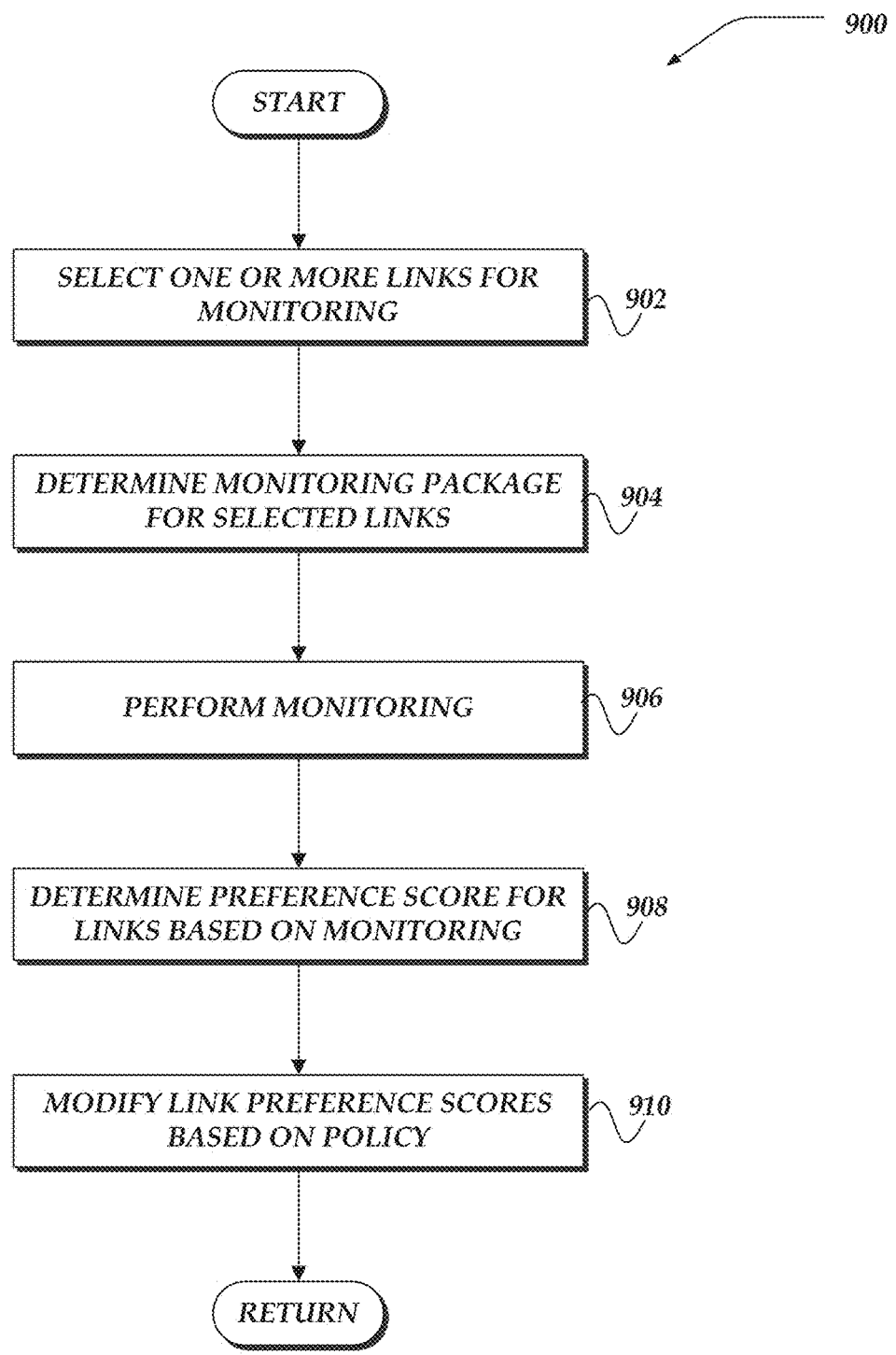
FIG. 9 illustrates a flowchart of a process for determining preference scores for gateway links in accordance with at least one of the various embodiments.

FIG. 9 illustrates a flowchart of process 900 for determining preference scores for gateway links in accordance with at least one of the various embodiments. After a start block, at block 902, a monitoring engine may be arranged to select one or more gateway links for monitoring. In one or more of the various embodiments, gateway computers that have two or more gateway links may be arranged to monitor one or more of the gateway links. In some embodiments, all gateway links may be monitored automatically, in other embodiments, monitoring engines may be arranged to employ configuration information or policy rules for determine which of the two or more gateway link should be monitored.

In some embodiments, monitoring engines may be arranged to monitor some or all of its gateway links at the same time. In other embodiments, monitoring engines may be arranged to monitor one or more gateway links at a time. Similarly, in one or more of the various embodiments, monitoring engines may be arranged to perform some monitoring actions for some or all gateway links at the same time while other monitoring actions are perform more selectively depending on configuration information or policy rules.

At block 904, in one or more of the various embodiments, the monitoring engine may be arranged to select one or more monitoring packages for monitoring the selected one or more gateway links. In one or more of the various embodiments, monitoring packages are collections of one or more monitoring actions. In some embodiments, configuration information may be used to define monitoring packages for one or more gateway links. For example, a monitoring package may define a particular set of monitoring actions, such as, passive latency tracking, active pinging or continuity checks, or the like. In some embodiments, monitoring packages may include rule information such as how often to perform a given monitoring action (e.g., every 15 minutes, each hour, or the like). In some embodiments, one or more monitoring packages may be selected for a given gateway link.

At block 906, in one or more of the various embodiments, the monitoring engine may be arranged to perform one or more monitoring actions. In one or more of the various embodiments, the particular actions may depend on the monitoring packages being used to monitor the one or more gateway links. In some embodiments, the monitoring may result in one or more metrics that may be collected or accumulated for each monitored gateway link.

In some embodiments, a monitoring engine may be arranged to collect statistical metrics (e.g., means, median, variances, or the like) that may be used to establish a baseline performance for each gateway link as well as baseline performance values for the gateway computer as a whole.

Further, in one or more of the various embodiments, monitoring engines may be arranged to collect or archive performance metrics that may be used for generating performance models that may be used to compare and evaluate current performances levels with expected performance levels. Also, in one or more of the various embodiments, one or more predictive models may be generated using one or more machine learning techniques for predicting or estimating gateway link performance or issues.

At block 908, in one or more of the various embodiments, the monitoring engine may be arranged to determine one or more preference scores based on one or more performance metrics that are determined based on the monitoring. At block 910, in one or more of the various embodiments, the monitoring engine may be arranged to modify the one or more preference scores based on one or more policies and the one or more performance metrics. Next, control may be returned to a calling process.

Figure 10:
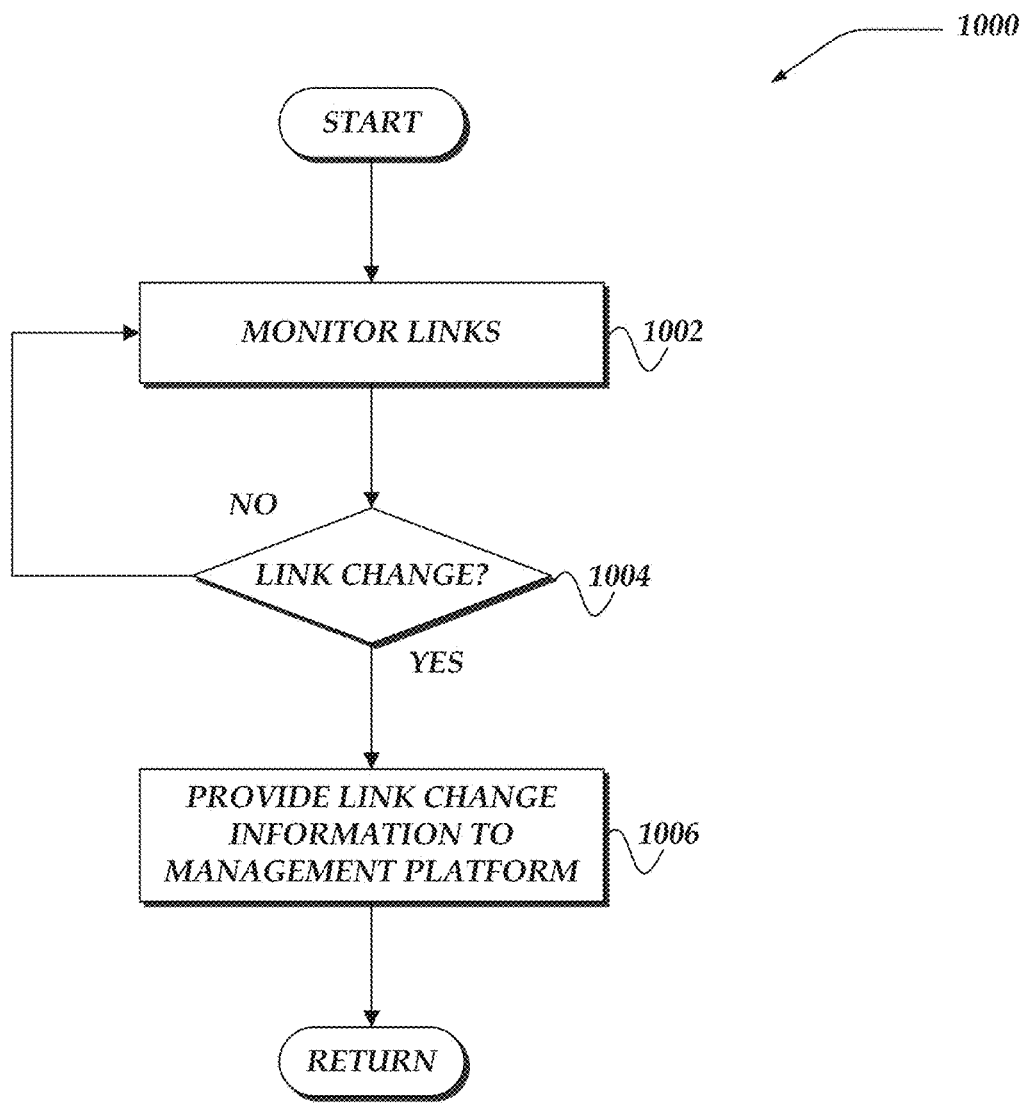
FIG. 10 illustrates a flowchart of a process for updating a management platform server in response to gateway link changes in accordance with at least one of the various embodiments.

FIG. 10 illustrates a flowchart of process 1000 for updating a management platform server in response to gateway link changes in accordance with at least one of the various embodiments. After a start block, at block 1002, in one or more of the various embodiments, a monitoring engine may be arranged to monitor one or more gateway links. As described above, the one or more gateway links of a gateway computer may be monitored to determine one or more performance metrics that may be used to associate a preference score with some or all of the gateway links.

At decision block 1004, in one or more of the various embodiments, if the active gateway links change or are otherwise modified, control may flow to block 1006; otherwise, control may loop back to block 1004. In one or more of the various embodiments, as described above, a gateway engine may be arranged to associate node traffic with one or more gateway links based on preference scores, policy rules, or the like. The one or more associated gateway links may be considered the active gateway links that are used for sending or receiving network traffic. In some cases, the gateway engine may select a change gateway links depending on the current preference scores, one or more policies, or the like. Accordingly, in one or more of the various embodiments, changes in preference scores, policies, network performance, network costs, content-type, application behavior, or the like, may trigger a gateway engine change gateway links. In one or more of the various embodiments, as described above, this may cause one or more of the underlying network addresses associated with the gateway computer to change.

At block 1006, in one or more of the various embodiments, the gateway engine may be arranged to provide the one or more gateway link changes to a management platform server. As described above, management platform servers may be arranged to maintain or enforce policy, routes, whitelists, blacklists, or the like, that may be used to control how node computers, gateway computers, or relay computers may communicate with each other. Accordingly, in some embodiments, the management platform needs to be informed if a gateway computer changes gateway links.

In one or more of the various embodiments, the gateway engine may communicate one or more control messages to its management platform server if a new or different gateway link is used. In one or more of the various embodiments, the gateway identifier (GID) associated with the gateway computer remains unchanged or otherwise not impacted by the change of gateway links. Accordingly, the management platform may incorporate the change to the gateway link(s) without requiring a complete handshake from the gateway computer. In one or more of the various embodiments, the management platform server may use the session secrets established during a previous handshake to validate the network traffic if needed.

In one or more of the various embodiments, in addition to management platform servers, one or more relay computers may also be updated. Accordingly, in some embodiments, the gateway computer that is changing gateway links may submit a control message to one or more relay computer. In some embodiments, the gateway computer may be arranged to simply continue communication over the new or changed gateway link. In such cases, the relay computer may identify gateway computer traffic using the GID associated with the traffic. The relay computer may observe that the gateway link information has changed and update its connection/mapping tables as needed.

In one or more of the various embodiments, one or more gateway link changes may be caused or associated with unexpected performance degradations or errors associated with one or more gateway links. Accordingly, in one or more of the various embodiments, gateway computers may be arranged to generate, provide, or forward, one or more alert messages or events that may be arranged to communicate one or more of the underlying reasons for the gateway link to the management platform computer. The information provided by the alerts or events may be logged or provided to one or more responsible users. For example, in some embodiments, if the gateway link changes because one of two cellular radios on a gateway computer has failed, responsible users may be notified to enable them to take actions to repair or replace the failed cellular radio.

Likewise, in one or more of the various embodiments, alerts or events may be provided to enable link usage to tracked for managing costs or other usage resources that may be associated with different links. In some embodiments, informing users of the underlying reasons for the gateway link changes may enable users to modify preference score criteria or rules to reduce undesirable changes. For example, if users determine that the monitoring engine is selecting costly gateway links to often, a user may modify one or more of the preference score rules to reduce the number of times the costly gateway link is selected. For example, one or more switch-over threshold values may modified to allow cheaper links to be preferred over expensive links even though there is some level performance degradation on the cheaper links. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system or multi-core computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by one or more hardware microcontrollers instead of a CPU. In at least one embodiment, the one or more microcontrollers may directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing communication over one or more networks using one or more network computers, wherein execution of instructions by the one or more network computers perform the method comprising:
    instantiating a monitoring engine that performs actions, including:
        monitoring one or more links that are associated with a gateway computer, wherein the one or more links are associated with one or more network addresses, and wherein the gateway computer is associated with a gateway identifier (GID) that is separate from the one or more network addresses; and
        providing one or more metrics that are associated with the one or more monitored links based on the monitoring; and
    instantiating a gateway engine that performs actions, including:
        providing one or more scores that are associated with the one or more links based on the one or more metrics;
        modifying the one or more scores based on policy information provided by a platform engine;
        comparing the one or more links based on the one or more scores and the policy information;
        employing a result of the comparison to activate at least a portion of the one or more links, wherein the activated portion of the links is employed to communicate over the one or more networks with one or more other gateway computers, and wherein a network address that is associated with the activated portion of the links is provided to the platform engine, and wherein the platform engine associates the GID with the network address;
        comparing the one or more links based on one or more updated metrics; and
        employing a result of the comparison of the updated metrics to activate another portion of the one or more links, wherein a network address of the other portion of links is associated with the GID.

2. The method of claim 1, wherein monitoring the one or more links, further comprises, determining one or more target computers that are accessible over the one or more links.

3. The method of claim 1, wherein the one or more links, further comprise, a connection to one or more of a cellular wireless network, an Ethernet wired network, an optical fiber network, a microwave network, a plain old telephone system (POTS) network, or any type of a wireless network or wired network.

4. The method of claim 1, wherein the policy information defines one or more network routes in an overlay network to the one or more other gateway computers, wherein each route is accessible by the one or more links.

5. The method of claim 1, wherein associating the one or more scores with the one or more links, further comprises:
    receiving a message from a node computer that is directed to another node computer;
    determining an application that is associated with the message; and
    modifying the one or more scores based on one or more of a type of the application or a type of content included with the message.

6. The method of claim 1, wherein activating the portion of the one or more links, further comprises:
    activating two or more links; and employing the two or more activated links to simultaneously communicate over the one or more networks with the one or more other gateway computers.

7. A processor readable non-transitory storage media that includes instructions for managing communication over one or more networks, wherein execution of the instructions by the one or more network computers perform the method comprising:
instantiating a monitoring engine that performs actions, including:
monitoring one or more links that are associated with a gateway computer, wherein the one or more links are associated with one or more network addresses, and wherein the gateway computer is associated with a gateway identifier (GID) that is separate from the one or more network addresses; and
providing one or more metrics that are associated with the one or more monitored links based on the monitoring; and
instantiating a gateway engine that performs actions, including:
providing one or more scores that are associated with the one or more links based on the one or more metrics;
modifying the one or more scores based on policy information provided by a platform engine;
comparing the one or more links based on the one or more scores and the policy information;
employing a result of the comparison to activate at least a portion of the one or more links, wherein the activated portion of the links is employed to communicate over the one or more networks with one or more other gateway computers, and wherein a network address that is associated with the activated portion of the links is provided to the platform engine, and wherein the platform engine associates the GID with the network address;
comparing the one or more links based on one or more updated metrics; and
employing a result of the comparison of the updated metrics to activate another portion of the one or more links, wherein a network address of the other portion of links is associated with the GID.

8. The media of claim 7, wherein monitoring the one or more links, further comprises, determining one or more target computers that are accessible over the one or more links.

9. The media of claim 7, wherein the one or more links, further comprise, a connection to one or more of a cellular wireless network, an Ethernet wired network, an optical fiber network, a microwave network, a plain old telephone system (POTS) network, or any type of a wireless network or wired network.

10. The media of claim 7, wherein the policy information defines one or more network routes in an overlay network to the one or more other gateway computers, wherein each route is accessible by the one or more links.

11. The media of claim 7, wherein associating the one or more scores with the one or more links, further comprises:
receiving a message from a node computer that is directed to another node computer;
determining an application that is associated with the message; and
modifying the one or more scores based on one or more of a type of the application or a type of content included with the message.

12. The media of claim 7, wherein activating the portion of the one or more links, further comprises:
activating two or more links; and
employing the two or more activated links to simultaneously communicate over the one or more networks with the one or more other gateway computers.

13. A system for managing communication over one or more networks, comprising:
a network computer, comprising:
one or more transceivers that communicate over the one or more networks;
a memory that stores at least instructions; and
one or more processors that execute instructions that perform actions, including:
instantiating a monitoring engine that performs actions, including:
monitoring one or more links that are associated with a gateway computer, wherein the one or more links are associated with one or more network addresses, and wherein the gateway computer is associated with a gateway identifier (GID) that is separate from the one or more network addresses; and
providing one or more metrics that are associated with the one or more monitored links based on the monitoring; and
instantiating a gateway engine that performs actions, including:
providing one or more scores that are associated with the one or more links based on the one or more metrics;
modifying the one or more scores based on policy information provided by a platform engine;
comparing the one or more links based on the one or more scores and the policy information;
employing a result of the comparison to activate at least a portion of the one or more links, wherein the activated portion of the links is employed to communicate over the one or more networks with one or more other gateway computers, and wherein a network address that is associated with the activated portion of the links is provided to the platform engine, and wherein the platform engine associates the GID with the network address;
comparing the one or more links based on one or more updated metrics; and
employing a result of the comparison of the updated metrics to activate another portion of the one or more links, wherein a network address of the other portion of links is associated with the GID; and
a client computer, comprising:
one or more transceivers that communicate over the one or more networks;
a memory that stores at least instructions; and
one or more processors that execute instructions that perform actions, including:
communicating over one or more separate links to the gateway computer.

14. The system of claim 13, wherein monitoring the one or more links, further comprises, determining one or more target computers that are accessible over the one or more links.

15. The system of claim 13, wherein the one or more links, further comprise, a connection to one or more of a cellular wireless network, an Ethernet wired network, an optical fiber network, a microwave network, a plain old telephone system (POTS) network, or any type of a wireless network or wired network.

16. The system of claim 13, wherein the policy information defines one or more network routes in an overlay network to the one or more other gateway computers, wherein each route is accessible by the one or more links.

17. The system of claim 13, wherein associating the one or more scores with the one or more links, further comprises:
   receiving a message from a node computer that is directed to another node computer;
   determining an application that is associated with the message; and
   modifying the one or more scores based on one or more of a type of the application or a type of content included with the message.

18. The system of claim 13, wherein activating the portion of the one or more links, further comprises:
   activating two or more links; and
   employing the two or more activated links to simultaneously communicate over the one or more networks with the one or more other gateway computers.

19. A network computer for managing communication over one or more networks, comprising:
   one or more transceivers that communicate over the one or more networks;
   a memory that stores at least instructions; and
   one or more processors that execute instructions that perform actions, including:
      instantiating a monitoring engine that performs actions, including:
         monitoring one or more links that are associated with a gateway computer, wherein the one or more links are associated with one or more network addresses, and wherein the gateway computer is associated with a gateway identifier (GID) that is separate from the one or more network addresses; and
         providing one or more metrics that are associated with the one or more monitored links based on the monitoring; and
      instantiating a gateway engine that performs actions, including:
         providing one or more scores that are associated with the one or more links based on the one or more metrics;
         modifying the one or more scores based on policy information provided by a platform engine;
         comparing the one or more links based on the one or more scores and the policy information;
         employing a result of the comparison to activate at least a portion of the one or more links, wherein the activated portion of the links is employed to communicate over the one or more networks with one or more other gateway computers, and wherein a network address that is associated with the activated portion of the links is provided to the platform engine, and wherein the platform engine associates the GID with the network address;
         comparing the one or more links based on one or more updated metrics; and
         employing a result of the comparison of the updated metrics to activate another portion of the one or more links, wherein a network address of the other portion of links is associated with the GID.

20. The network computer of claim 19, wherein monitoring the one or more links, further comprises, determining one or more target computers that are accessible over the one or more links.

21. The network computer of claim 19, wherein the one or more links, further comprise, a connection to one or more of a cellular wireless network, an Ethernet wired network, an optical fiber network, a microwave network, a plain old telephone system (POTS) network, or any type of a wireless network or wired network.

22. The network computer of claim 19, wherein the policy information defines one or more network routes in an overlay network to the one or more other gateway computers, wherein each route is accessible by the one or more links.

23. The network computer of claim 19, wherein associating the one or more scores with the one or more links, further comprises:
   receiving a message from a node computer that is directed to another node computer;
   determining an application that is associated with the message; and
   modifying the one or more scores based on one or more of a type of the application or a type of content included with the message.

24. The network computer of claim 19, wherein activating the portion of the one or more links, further comprises:
   activating two or more links; and
   employing the two or more activated links to simultaneously communicate over the one or more networks with the one or more other gateway computers.

* * * * *